United States Patent [19]

Takatoh et al.

[11] Patent Number: 5,128,788
[45] Date of Patent: Jul. 7, 1992

[54] LIQUID-CRYSTAL ORIENTATING FILM, METHOD OF MANUFACTURING THE FILM, AND LIQUID-CRYSTAL ELEMENT HAVING THE FILM

[75] Inventors: Kohki Takatoh, Yokohama; Masanori Sakamoto, Kawasaki, both of Japan

[73] Assignee: Kabushiki Kaisha Toshiba, Kawasaki, Japan

[21] Appl. No.: 589,781

[22] Filed: Sep. 26, 1990

[30] Foreign Application Priority Data

Sep. 29, 1989 [JP] Japan ................... 1-252126

[51] Int. Cl.$^5$ .................. G02F 1/1337; C09K 19/00
[52] U.S. Cl. ......................... 359/76; 359/75; 359/78; 428/1
[58] Field of Search ............... 350/340, 341; 427/372.2, 379; 428/1; 359/75, 76, 78

[56] References Cited

U.S. PATENT DOCUMENTS

| | | | |
|---|---|---|---|
| 4,247,174 | 1/1981 | Walter | 350/340 |
| 4,725,517 | 2/1988 | Nakanowatari et al. | 350/340 |
| 4,763,995 | 8/1988 | Katagiri et al. | |
| 4,878,742 | 11/1989 | Ohkubo et al. | 350/340 |

FOREIGN PATENT DOCUMENTS

| | | |
|---|---|---|
| 0301660 | 1/1989 | European Pat. Off. |
| 2931259 | 2/1981 | Fed. Rep. of Germany ...... 350/341 |
| 2931293 | 2/1981 | Fed. Rep. of Germany . |
| 2206981 | 6/1974 | France . |
| 63-49788 | 3/1988 | Japan . |
| 1-210932 | 8/1989 | Japan . |

OTHER PUBLICATIONS

Patent Abstracts of Japan, vol. 8, No. 45 (P-257)(1482) Feb. 23, 1984 & JP-A-58 196 524 (Fujitsu K.K.) Nov. 16, 1983.

"Alignment of liquid crystals using submicrometer periodicity gratings," by Flanders et al, App. Physics Letters, vol. 32, No. 10, May 15, 1978, p. 597.

*Primary Examiner*—Stanley D. Miller
*Assistant Examiner*—Anita Pellman Gross
*Attorney, Agent, or Firm*—Oblon, Spivak, McClelland, Maier & Neustadt

[57] ABSTRACT

Disclosed herein is a liquid-crystal orientating film which is a polymer film consisting of stripe-shaped contracted portions extending in a predetermined direction and non-contracted portions located adjacent to the contracted portions, and which is designed to orientate liquid-crystal molecules in the direction in which the portions of the film are contracted and non-contracted. The liquid-crystal orientating film has been manufactured by applying light to selected portions of a polymer film, thereby photo-curing these portions, thus forming stripe-shaped contracted portions, stretching the remaining portions of the film, which are located adjacent to the contracted portions, by virtue of the contraction of the portions applied with light.

16 Claims, 1 Drawing Sheet

LIQUID-CRYSTAL ORIENTATING FILM, METHOD OF MANUFACTURING THE FILM, AND LIQUID-CRYSTAL ELEMENT HAVING THE FILM

BACKGROUND OF THE INVENTION

1. Field of the Invention

The present invention relates to a liquid-crystal (LC) orientating film, a method of manufacturing the film, and a LC element having the film.

2. Description of the Related Art

LC displays are small flat panel displays widely incorporated in desk-top calculators, watches, and similar small devices Recently, they have put to use in automobiles and personal computers. Further, they are now used as small-sized TV receivers, for displaying moving pictures.

These LC displays are almost identical in the structure of the LC cells they have. Each LC cell comprises a pair of substrates opposing each other, and a mass of liquid crystal filled in the gap between the substrates. The substrates are spaced apart for a predetermined distance by means of spacers, and are sealed together at their edges by means of sealing agent. Electrodes and an LC orientating film are formed on that surface of either substrate which faces the other substrate.

The LC orientating film is designed to orientate LC molecules in one direction. Two types of LC orientating films are available. The first type, which is more popular, orientates LC molecules parallel to the substrate. The second type, orientates LD molecules perpendicular to the substrate.

The LC orientating film is manufactured by either of the following methods:

(1) Rubbing method, wherein a polymer film such as a polyimide film or a polyvinyl alcohol film is formed on the surface of a substrate, and is rubbed with cloth such as velvet, thereby imparting LC-orientating ability to the polymer film.

(2) Oblique vapor-deposition method, wherein vapor of a metal oxide such as SiO is applied in a line inclined at a predetermined angle to the substrate, thereby forming a metal oxide film on the surface of the substrate.

The rubbing method is employed in most cases, since it involves a simple process of rubbing the polymer film with cloth, and can produce many LC orientating films within a short time. This method, however, is not suitable for manufacturing large, high-precision LC displays for the following two reasons. First, as the film is rubbed with cloth, a great amount of static electricity is generated in the film, which damages thin-film transistors or cause dust to stick onto the substrate. Second, since the cloth contacts the substrate in most cases, the film is contaminated.

The oblique vapor-deposition method is rarely employed in practice for the following three reasons. First, it takes a long time to perform this method. Second, the LC molecules will have too large a pre-tilt angle. Third, the film formed by this method has but a poor LC orientating ability.

SUMMARY OF THE INVENTION

The object of the present invention is to provide an improved liquid-crystal (LC) orientating film which is free of contamination and generation of static electricity and which can be manufactured within a short time, a method of manufacturing this LC orientating film, and a liquid-crystal display element having the LC orientating film.

According to a first aspect of the invention, there is provided an LC orientating film comprising a polymer film consisting of stripe-shaped contracted portions and stretched portions located adjacent to the contracted portions.

According to a second aspect of this invention, there is provided a method of manufacturing an LC orientating film, comprising the steps of applying light to selected portions of a polymer film, thereby forming stripe-shaped contracted portions, and forming stretched portions of the film which are located adjacent to the contracted portions.

According to a third aspect of the present invention, there is provided an LC display element comprising a pair of opposing substrates, either substrate having electrodes and an LC orientating film formed on the surface opposing the other substrate, and a mass of liquid crystal filled in the gap between the substrates, and said LC orientating film being a polymer film consisting of stripe-shaped contracted portions extending in a predetermined direction and stretched portions located adjacent to the contracted portions.

According to the present invention, an LC orientating film and an LC display element having this film can easily be manufactured. The film is free of contamination, scratches, static electricity, unlike the LC orientating films made by the rubbing method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1A:
FIGS. 1A to 1D are sectional views, explaining how to manufacture an LC orientating film in a method according to the invention.

In the present invention, a polymer sufficiently strong and insoluble in liquid crystal should be used to form an LC orientating film. More specifically, a photo-curable resin, a thermoplastic resin, or a thermosetting resin can be used.

The photo-curable resin used in the present invention is of the type which has photosensitive functional group and which undergoes, when exposed to light, polymerization such as radical polymerization, cationic polymerization, or anionic polymerization. The photosensitive functional group may be: acryloyl group ($CH_2=CH-COO-$), methacryloyl group
($CH_2=C(CH_3)-COO-$), acrylamide group
($CH_2=CH-CONH-$), maleic acid diester group
($-OCOCH=CH-COO-$), allyl group
($CH_2=CH-CH_2-$), vinyl ether group
($CH_2=CH-O-$), vinyl thioether group
($CH_2=CH-S-$), vinyl amino group
($CH_2=CH-NH-$), glycidyl group

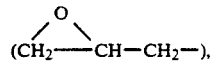

acetylene unsaturated group ($-C\equiv C-$). Of these photo-curable resins, that resin having acryloyl group, methacryloly group, or acrylamide group is the most preferable in terms of polmerization rate, degree of adhesion and heat resistance. These resins can be used either singly or in combination. A photosensitizer is generally used with the photo-curable resin.

The thermoplastic resin used in this invention is one selected from the group consisting of chlorinated polyethylene, polyethylene terephthalate, polypropylene, polyisobutylene, polyvinyl chloride, polyvinylidine chloride, polyvinyl acetate, polyvinylalcohol, polyvinyl acetal, acrylic resin, polyacrylonitrile, polystyrene, acetal resin, polyamide, polycarbonate, celluouse plastic, styrene-acrylonitrile copolymer, and polyimide. Of these thermoplastic resins, polyvinyl alcohol, polyvinyl acetal, acrylic resin, polystyrene, acetal resin, polyamide, and polyimide are preferable ones, since they can be easily processed into film and have a high degree of adhesion. The thermoplastic resins, specified above, can be used either singly or in combination.

The thermosetting resin used in the invention is one selected from the group consisting of phenol resin, urea resin, epoxy resin, unsaturated polyester resin, alkyd resin, melamine resin, silicone resin, polyurethane resin, diallyl phthalate resin, natural rubber, isoprene rubber, butadiene rubber, styrene-butadiene rubber, chloroprene rubber, nitrile rubber, butyl rubber, acrylic rubber, and ethylene propylene rubber. Of these resins, epoxy resin, and unsaturated polyester resin are preferable ones, since they can be easily processed into film and excel in both degree of adhesion and heat resistance. The resins, specified above, can be used either singly or in combination. A curing agent is generally used with the thermosetting resin.

Any portion of a photo-curable resin film contracts when it is exposed to light, since it is photochemically excited and undergoes polymerization. Any portion of a thermoplastic resin contracts when it is exposed to light, since it is first heated and then cooled. Further, any portion of a thermosetting resin undergoes curing reaction and thus contracts when it is exposed to light.

If only one of the three types of resins, i.e., photo-curable resin, thermoplastic resin, and thermosetting resin is used to form an LC orientating film, it is advisable to use photo-curable resin. However, photo-curable resin is, most cases, neither so mechanically strong nor adequately resistant to heat unless it is exposed to light. It is therefore desirable that photo-curable resin be used in combination with thermosetting resin or thermoplstic resin. In the case where the photo-curable resin is mixed with thermosetting resin or thermoplasic resin, its mixing ratio should better be 5 to 99% by weight based on the resin mixture, preferably 50 to 95% by weight. If the mixing ratio of the photo-curable resin is less than 5% by weight, the mixture resin cannot contracts sufficiently after it is exposed to light. If the mixing ratio is more than 99% by weight, the mixture resin will have but an insufficient strength and an inadequate heat resistance after it is exposed to light.

According to the present invention, besides the resins specified above, some resins which have both photosensitive functional group and thermally reactive functional group can be used as material of an LC orientating film. They are, for example, ones prepared by partially reacting epoxy resin with acrylic acid, methacrylic acid, cinnamic acid, maleic acid, and the like. The epoxy resin, thus used, can be bisphenol A type, bisphenol F type, phenol novolak type, and cycloaliphatic epoxy resin. Further, glycidyl methacrylate (GMA) having methacryloyl group and glycidyl group, or resin AXE (manufactured by Kanegafuchi Kagaku Kogyo K.K.) having glycidyl group and acrylamide group, can be used as material of the LC orientating film.

The LC oriengating film of the invention may comprise two or more layers. In this case, it would be desirable that the lower layers be made of soft material such as silicone rubber or natural rubber, and the upper layers be made of abovementioned polymer. In this multilayered structure, the lower layers enhance the contraction and stretch of the upper layers.

The LC orientating film according to the present invention is made of a polymer film consisting of stripe-shaped contracted portions and stretched portion located adjacent to the contracted portions. The LC orientating film is made by applying light to those stripe-shaped portions of the polymer film which extend parallel in a predetermined direction and spaced apart from each other, thereby forming stripe-shaped contracted portions, whereas the other portions of the film, not exposed to light and located among the light-exposed portions, remain as stretched portions. Light can be applied through a photomask having parallel transparent stripes to the selected stripe-shaped portions of the polymer film. An alternative method is to pass light through a prism, thus generating parallel rays containing interference fringes, and then to apply the parallel rays to the polymer film.

A method of manufacturing an LC orientating film will be explained in greater detail, with reference to FIGS. 1A to 1C and also FIG. 2.

Figure 1B:
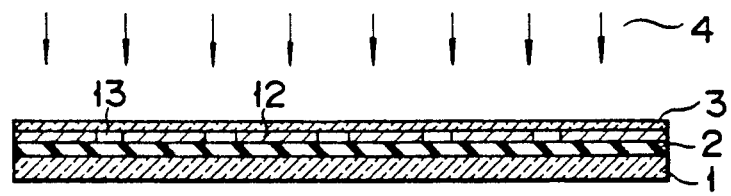
Figure 1C:
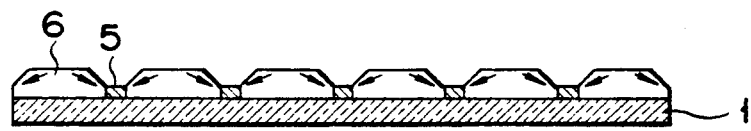
Figure 2:
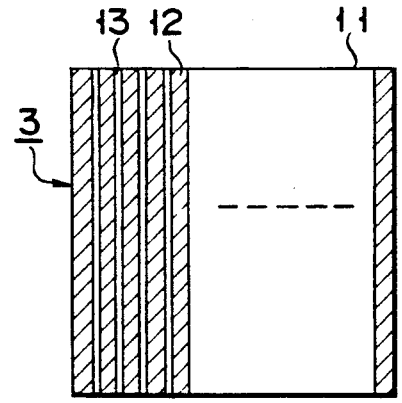
FIG. 2 is a plan view of the photomask used in manufacturing the LC orientating film.

First, as is shown in FIG. 1A, a polymer composition is coated on that surface of a substrate 1 on which electrodes (not shown) are formed, by means of spin-coating or printing. Then, the coating is dried, thereby forming a polymer film 2. Next, as is shown in FIG. 1B, a photomask 3 is placed above the substrate 1. As is illustrated in FIG. 2, the photomask 2 consists of parallel opaque stripes 12 and parallel transparent stripes 13 located among the opaque stripes 12. Light is applied through the transparent strips 13 of the photomask 3 onto the polymer film 2. As a result, parallel stripe-shaped portions of the film 2 are irradiated with light, and the photo-curable resin contained in these portions undergo curing. The irradiated portions of the film 2 therefore contract. As they contract, stress is exerted on the unirradiated portions of the film 2 in the direction of arrows shown in FIG. 1C. As a result of this, the unirradiated portions of the film 2 are stretched, thus forming stretched portions 6. An LC orientating film is thus manufactured.

Figure 1D:
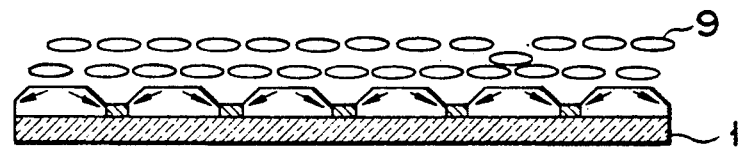

Thereafter, liquid crystal is applied onto the LC orientating film as is illustrated in FIG. 1D. When the LC molecules contact the LC orientating film 2, they are orientated in the direction in which the portions 5 are contracted and the portions 6 are stretched. Further since the contracted portions 5 are thinner than the stretched portions 6 as is clearly illustrated in FIG. 1D, the LC orientating film 2 has parallel crests and troughs. Due to these crests and troughs, or configuration anisotropy, the LC molecules 9 can readily be orientated along the curving surfaces of the portions 5 and 6.

As may be understood from the above, the LC orientating film of this invention can easily be manufactured. Further, it does not accumulate static electricity to damage thin-film transistors, to attract duct thereto, or to contaminate a substrate, unlike the LC orientating films made by the rubbing method.

According to the present invention, before or after the light application to the polymer film, the film can be heat-treated for the purpose of imparting sufficient mechanical strength and heat resistance to the unirradiated portions of the film. For a similar purpose, the entire film can be exposed to less intense light, either before or after the light is applied to the film for forming the contracted portions 5 and stretched portions 6.

The portions 5 and 6 of the LC orientating film 2 have widths ranging from 0.1 to 100 μm, preferably 1 to 50 μm. for the following reason. First, it is difficult to apply light through a photomask to the polymer film in such a way as to form contracted or stretched portions having a width less than 0.1 μm. If the portions 5 and 6 have width greater than 100 μm, they will fail to orientate LC molecules sufficiently. The width ratio of the stretched portions 6 to the contracted portions 5 is 1 to 100, preferably 5 to 10.

The polymer film has a thickness of 10 to 1000 nm, preferably 10 to 100 nm. If its thickness is less than 10 nm, the LC orientating film 2 made by processing this film will fail to orientate LC molecules sufficiently. On the other hand, if its thickness is more than 1000 nm, it will have a high electrical resistance and adversely influence the operating characteristics of the LC display element having the film 2.

Figure 3:
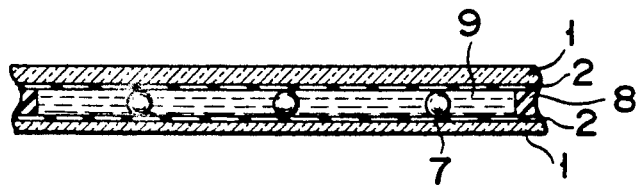
FIG. 3 is a sectional view illustrating an LC display element according to the present invention.

FIG. 3 illustrates an LC display element according to the present invention. The LC display element is manufactured in the following way.

First, an LC orientating film 2 having contracted portions and stretched portions is formed, by the method described above, on that surface of a substrate 1 on which electrodes (not shown) are arranged. Similarly, an LC orientating film 2 of the same type is formed on that surface of another substrate 1 on which electrodes (not shown) are arranged. The two substrates 1, either now provided with the film 2, are spaced apart for a predetermined distance by means of spacers 7, with the LC orientating films 2 facing each other. The substrates 1 are sealed at their edges by means of sealing agent 8. Then liquid crystal 9 is injected into the gap between the substrates 1.

In the present invention, the electrodes can be arranged on the substrates, forming either a simple matrix or an active matrix. The active matrix contains thin-film transistors (TFT) manufactured for each pixel. In this case, the LC display element has better display characteristic.

The liquid crystal used in the invention is not limited to a particular one Whichever liquid crystal can be used, such as twisted nematic (TN) liquid crystal, super twisted nematic (STN) liquid crystal, ferroelectric liquid crystal (chiral smectic liquid crystal). Although TN liquid crystal has long been used commonly, it should better not be used in a large, moving-picture display since it responds to signals rather slowly and may generate crosstalk. STN liquid crystal has a twist angle ranging from 250° to 360°, and is a better choice in terms of image contrast than TN liquid crystal whose twist angle is 90°. When ferroelectric liquid crystal is used, spontaneous polarization occurs by virtue of the interaction between the ferroelectric liquid crystal and the LC orientating film, and interacts with an electric field, thus driving the liquid crystal and, hence, improving the response of the LC display element.

The present invention will now be further described, with reference to actual examples.

EXAMPLES 1-11

The materials listed below were mixed in the ratio (parts by weight) shown in Table 1, thereby preparing six polymer compositions A to F.

| | |
|---|---|
| Thermoplastic resin: | polyimide resin, tradename CRC-6011A manufactured by Sumitomo Bakelite K.K. |
| Photo-curable resin: | acrylic resin I (solid), tradename Yupymer UV SA-4100 manufactured by Mitsubishi Yuka K.K. |
| Photo-curable resin: | acrylic resin II (liquid), tradename NKE ESTER U-6PHA, manufactured by Shinnakamura Kagaku Kohgyo K.K. |
| Sensitizer: | benzyldimethylketal, tradename Imegacure 651, manufactured by Nagase Sangyo |
| Solvent: | N-methylpyrrolidone |

The polymer compositions A to F were spin-coated on glass substrate which had been washed clean. The composition-coated substrates were heated at 180° for 60 minutes, thereby evaporating the solvent, and thus forming 1 μm thick polymer films on the glass substrates. A photomask was placed above each glass substrate, and the parallel rays emitted from a high-pressure mercury lamp were applied at the intensity of 1400mJ/cm$^2$ through the photomask onto the polymer film. The photomask used consisted parallel stripe-shaped opaque portions having a predetermined width, and parallel stripe-shaped transparent portions located among the opaque portions and having a predetermined width. As a result of the application of parallel rays, the polymer film was processed into an LC orientating film which consisted of parallel stripe-shaped contracted portions having a width corresponding to that of the transparent portions of the photomask, and parallel stripe-shaped stretched portions located among the contracted portions and having a width corresponding to that of the opaque portions of the photomask. Each width is shown in Table 2.

Two substrates, either having an LC orientating film made of each polymer composition, were spaced apart by 10 μm by spacers, with the LC orientating films facing each other. The substrates were sealed together at their edges. Then, nematic liquid crystal (i.e., ZLI-1370 manufactured Merk, Inc.) was filled in the gap between the substrates, thereby making an LC display cell. Thus, eleven LC display cells, or Examples 1 to 11, identified in Table 2 and having LC orientating films made of compositions A to F, were manufactured. These cells were examined under a polarization microscope, thus evaluating the degree of orientation of LC molecules sealed in each cell. The results were as is shown in Table 2. As is evident from Table 2, Examples 1 to 11 all exhibited a high or a very high degree of orientation.

In addition, the microscope examination showed that none of Examples 1 to 11 had LC orientating films contaminated or scratched or generated static electricity.

TABLE 1

|  | A | B | C | D | E | F |
|---|---|---|---|---|---|---|
| Polyimide Resin | 100 | 100 | 100 | 100 | 100 | 100 |
| Acrylic Resin I (Solid) | 10 | 10 | 5 | 0 | 5 | 5 |
| Acrylic Resin II (Liquid) | 0 | 10 | 5 | 10 | 5 | 5 |
| Sensitizer | 1 | 1 | 1 | 1 | 2 | 3 |
| Solvent | 5 | 5 | 5 | 5 | 5 | 5 |

TABLE 2

| Example | Polymer Film | Width of Contracted Portions (μm) | Width of Stretched Portions (μm) | LC-Orientating Ability |
|---|---|---|---|---|
| 1 | A | 2 | 5 | ⊚ |
| 2 | B | 2 | 5 | ⊚ |
| 3 | C | 2 | 5 | ⊚ |
| 4 | D | 2 | 5 |  |
| 5 | E | 2 | 5 |  |
| 6 | F | 2 | 5 |  |
| 7 | A | 1 | 10 | ⊚ |
| 8 | A | 1 | 20 |  |
| 9 | A | 1 | 30 |  |
| 10 | A | 1 | 40 |  |
| 11 | A | 2 | 20 |  |

⊚Very Good
Good

EXAMPLES 12-19

The materials listed below were mixed in the ratio (parts by weight) shown in Table 3, thereby preparing seven polymer compositions G to M.

| Photo-curable resin: | acrylic resin III (solid), prepared by reacting one equivalent amount of acrylic acid with glycidyl group of Epicoat 1001 manufactured by Yuka Shell Epoxy K.K. |
|---|---|
| Photo-curable resin: | acrylic resin I (solid), tradename Yupymer UV SA-4100 manufactured by Mitsubishi Yuka K.K. |
| Sensitizer: | benzyldimethylketal, tradename Imegacure 651, manufactured by Nagase Sangyo |
| Solvent: | N-methylpyrrolidone |

Using the polymer compositions G to M, LC orientating films were formed on glass substrates. Then, using these substrates, eight LC display cells, or Examples 12 to 19, were manufactured by the same method as in Examples 1 to 11. Further, Examples 11 to 19 were examined under the polarization microscope, thus evaluating the degree of orientation of LC molecules sealed in each of these cells. The results were as is shown in Table 4. As is evident from Table 4, Examples 12 to 19 all exhibited a high or a very high degree of orientation.

The microscope examination also showed that none of Examples 12 to 19 had LC orientating films contaminated or scratched or generated static electricity.

TABLE 3

|  | G | H | I | J | K | L | M |
|---|---|---|---|---|---|---|---|
| Acrylic Resin III (Solid) | 50 | 40 | 30 | 60 | 70 | 80 | 90 |
| Acrylic Resin I (Solid) | 50 | 60 | 70 | 40 | 30 | 20 | 10 |
| Sensitizer | 8 | 8 | 8 | 8 | 8 | 8 | 8 |
| Solvent | 10 | 10 | 10 | 10 | 10 | 10 | 10 |

TABLE 1

| Example | Polymer Film | Width of Contracted Portions (μm) | Width of Stretched Portions (μm) | LC-Orientating Ability |
|---|---|---|---|---|
| 12 | G | 2 | 5 |  |
| 13 | H | 2 | 5 | ⊚ |
| 14 | I | 2 | 5 |  |
| 15 | J | 2 | 5 |  |
| 16 | K | 2 | 5 | ⊚ |
| 17 | L | 2 | 5 | ⊚ |
| 18 | M | 2 | 5 |  |
| 19 | G | 2 | 10 |  |

EXAMPLES 20-27

The polymer compositions G to M prepared for use in Examples 12 to 19 were spin-coated on glass substrate which had been washed clean. The substrates coated with the compositions were heated at 100° for 30 minutes, thereby evaporating the solvent, and thus forming 1 μm thick polymer films on the glass substrates. A photomask was placed above each glass substrate, and the parallel rays emitted from a high-pressure mercury lamp were applied at the intensity of 1400mJ/cm$^2$ through the photomask onto the polymer film, thereby forming an LC orientating film. Further, light was applied at the intensity of 100mJ/cm$^2$ to the entire surface of the LC orientating film, thus increasing the heat resistance of the LC orientating film.

Then, using these substrates, eight LC display cells, or Examples 20 to 27, were manufactured by the same method as in Examples 1 to 11. Examples 20 to 27 were examined under the polarization microscope, thus evaluating the degree of orientation of LC molecules sealed in each of these cells. The results were as is shown in Table 5. As is evident from this table, Examples 20 to 27 all exhibited a high degree of orientation.

TABLE 5

| Example | Polymer Film | Width of Contracted Portions (μm) | Width of Stretched Portions (μm) | LC-Orientating Ability |
|---|---|---|---|---|
| 20 | G | 2 | 5 |  |
| 21 | H | 2 | 5 |  |
| 22 | I | 2 | 5 |  |
| 23 | J | 2 | 5 |  |
| 24 | K | 2 | 5 |  |
| 25 | L | 2 | 5 |  |
| 26 | M | 2 | 5 |  |
| 27 | G | 2 | 10 |  |

EXAMPLES 28-35

The polymer compositions G to M prepared for use in Examples 12 to 19 were spin-coated on glass substrate which had been washed clean. The substrates coated with the compositions were heated at 100° for 30 minutes, thereby evaporating the solvent, and thus forming 1 μm thick polymer films on the glass substrates. Light was applied at the intensity of 100mJ/cm² to the entire surface of the polymer film formed on each substrate, thereby increasing the heat resistance of the film. Next, a photomask was placed above each substrate, and the parallel rays were applied through the photomask onto the polymer film at the strength of 1400mJ/cm², thereby forming an LC orientating film.

Then, using these substrates, eight LC display cells, or Examples 28 to 35, were manufactured by the same method as in Examples 1 to 11. Examples 28 to 35 were examined under the polarization microscope, thus evaluating the degree of orientation of LC molecules sealed in each of these cells. The results were as is shown in Table 6. As is evident from this table, Examples 28 to 35 all exhibited a high degree of orientation.

TABLE 6

| Example | Polymer Film | Width of Contracted Portions (μm) | Width of Stretched Portions (μm) | LC-Orientating Ability |
|---|---|---|---|---|
| 28 | G | 2 | 5 | |
| 29 | H | 2 | 5 | |
| 30 | I | 2 | 5 | |
| 31 | J | 2 | 5 | |
| 32 | K | 2 | 5 | |
| 33 | L | 2 | 5 | |
| 34 | M | 2 | 5 | |
| 35 | G | 2 | 10 | |

EXAMPLES 36-43

The materials listed below were mixed in the ratio (parts by weight) shown in Table 7, thereby preparing seven polymer compositions N to T.

| | |
|---|---|
| Photo-curable resin: | acrylic resin III (solid), prepared by reacting one equivalent amount of acrylic acid with glycidyl group of Epicoat 1001 manufactured by Yuka Shell Epoxy K.K. |
| Thermosetting resin: | epoxy resin (solid), tradename Epicoat 1001, manufactured by Yuka Shell Epoxy K.K. |
| Sensitizer: | benzyldimethylketal, tradename Imegacure 651, manufactured by Nagase Sangyo |
| Curing agent: | 2-ethyl-4-methyl imidazole manufactured by Shikoku Kasei Kogyo K.K. |
| Solvent: | N-methylpyrrolidone |

The polymer compositions N to T were spin-coated on glass substrate which had been washed clean. The composition-coated substrates were heated at 100° for 30 minutes, thereby evaporating the solvent, and thus forming 1 μm thick polymer films on the glass substrates. A photomask was placed above each glass substrate, and the parallel rays emitted from a high-pressure mercury lamp were applied at the intensity of 1400mJ/cm² through the photomask onto the polymer film, thereby forming an LC orientating film. The LC orientating film was heated at 150° for 120 minutes, thus increasing the heat resistance thereof.

Then, using these substrates, eight LC display cells, or Examples 36 to 43, were manufactured by the same method as in Examples 1 to 11. Examples 36 to 43 were examined under the polarization microscope, thus evaluating the degree of orientation of LC molecules sealed in each of these cells. The results were as is shown in Table 8. As is evident from this table, Examples 36 to 43 all exhibited a high or a very high degree of orientation.

TABLE 7

| | N | O | P | Q | R | S | T |
|---|---|---|---|---|---|---|---|
| Acrylic Resin III (Solid) | 90 | 80 | 70 | 60 | 50 | 40 | 30 |
| Epoxy Resin (Solid) | 10 | 20 | 30 | 40 | 50 | 60 | 70 |
| Sensitizer | 8 | 8 | 8 | 8 | 8 | 8 | 8 |
| Curing Agent | 5 | 5 | 5 | 5 | 5 | 5 | 5 |
| Solvent | 10 | 10 | 10 | 10 | 10 | 10 | 10 |

TABLE 8

| Example | Polymer Film | Width of Contracted Portions (μm) | Width of Stretched Portions (μm) | LC-Orientating Ability |
|---|---|---|---|---|
| 36 | N | 2 | 5 | ⊙ |
| 37 | O | 2 | 5 | ⊙ |
| 38 | P | 2 | 5 | |
| 39 | Q | 2 | 5 | |
| 40 | R | 2 | 5 | ⊙ |
| 41 | S | 2 | 5 | |
| 42 | T | 2 | 5 | |
| 43 | Q | 2 | 10 | |

EXAMPLES 44-51

The polymer compositions N to T prepared for use in Examples 36 to 43 were spin-coated on glass substrate which had been washed clean. The substrates coated with the compositions were heated at 100° for 30 minutes, thereby evaporating the solvent, and thus forming 1 μm thick polymer films on the glass substrates. Next, the substrates were heated at 150° for 120 minutes, thereby increasing the heat resistance of the polymer films. Then, a photomask was placed above each substrate, and the parallel rays were applied through the photomask onto the polymer film at the intensity of 1400mJ/cm², thereby forming an LC orientating film.

Then, using these substrates, eight LC display cells, or Examples 44 to 51, were manufactured by the same method as in Examples 1 to 11. These examples were examined under the polarization microscope, thus evaluating the degree of orientation of LC molecules sealed in each of these cells. The results were as is shown in Table 9. As is evident from this table, Examples 44 to 51 all exhibited a high or a very high degree of orientation.

TABLE 9

| Example | Polymer Film | Width of Contracted Portions (μm) | Width of Stretched Portions (μm) | LC-Orientating Ability |
|---|---|---|---|---|
| 44 | N | 2 | 5 | |
| 45 | O | 2 | 5 | |
| 46 | P | 2 | 5 | ⊙ |

TABLE 9-continued

| Example | Polymer Film | Width of Contracted Portions ($\mu$m) | Width of Stretched Portions ($\mu$m) | LC-Orientating Ability |
|---|---|---|---|---|
| 47 | Q | 2 | 5 | |
| 48 | R | 2 | 5 | |
| 49 | S | 2 | 5 | ⊚ |
| 50 | T | 2 | 5 | |
| 51 | Q | 2 | 10 | |

EXAMPLES 52–57

The materials listed below were mixed in the ratio (parts by weight) shown in Table 10, thereby preparing six polymer compositions U to Z.

| | |
|---|---|
| photo-curable/thermo-setting resin: | epoxy-acrylate resin (solid), prepared by reacting 0.5 equivalent amount of acrylic acid with glycidyl group of Epicoat 1001 manufactured by Yuka Shell Epoxy K.K. |
| Photo-curable/thermo-setting resin: | epoxy-acrylamide resin (solid), tradename AXE manufactured by Kanegafuchi Kagaku Kogyo K.K. |
| Sensitizer: | benzyldimethylketal, tradename Imegacure 651, manufactured by Nagase Sangyo |
| Curing agent: | 2-ethyl-4-methyl imidazole manufactured by Shikoku Kasei Kogyo K.K. |
| Solvent: | N-methylpyrrolidone |

The polymer compositions U to Z were spin-coated on glass substrate which had been washed clean. The composition-coated substrates were heated at 100° for 30 minutes, thereby evaporating the solvent, and thus forming 1 $\mu$m thick polymer films on the glass substrates. A photomask was placed above each glass substrate, and the parallel rays emitted from a high-pressure mercury lamp were applied at the intensity of 1400mJ/cm$^2$ through the photomask onto the polymer film, thereby forming an LC orientating film. The LC orientating film was heated at 150° for 120 minutes, thus increasing the heat resistance thereof.

Then, using these substrates, six LC display cells, or Examples 52 to 57, were manufactured by the same method as in Examples 1 to 11. These examples were examined under the polarization microscope, thus evaluating the degree of orientation of LC molecules sealed in each of these cells. The results were as is shown in Table 11. As is evident from this table, Examples 52 to 57 all exhibited a high or a very high degree of orientation.

TABLE 10

| | U | V | W | X | Y | Z |
|---|---|---|---|---|---|---|
| Epoxy-Acrylate Resin (Solid) | 100 | 80 | 60 | 40 | 20 | 0 |
| Epoxy-Acrylamide Resin (Solid) | 0 | 20 | 40 | 60 | 80 | 100 |
| Sensitizer | 8 | 8 | 8 | 8 | 8 | 8 |
| Curing Agent | 5 | 5 | 5 | 5 | 5 | 5 |
| Solvent | 20 | 20 | 20 | 20 | 20 | 20 |

TABLE 11

| Example | Polymer Film | Width of Contracted Portions ($\mu$m) | Width of Stretched Portions ($\mu$m) | LC-Orientating Ability |
|---|---|---|---|---|
| 52 | U | 2 | 5 | |
| 53 | V | 2 | 5 | |
| 54 | W | 2 | 5 | ⊚ |
| 55 | X | 2 | 5 | ⊚ |
| 56 | Y | 2 | 5 | |
| 57 | Z | 2 | 5 | |

COMPARATIVE EXAMPLE

Films of polyimide resin were formed and processed by the rubbing method, thereby obtaining LC orientating films. These LC orientating films were examined under the polarization microscope. They were found to have countless scratches on their surfaces. Further, it was revealed that static electricity of about 20 kV had been generated in these LC orientating films.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. An LC display element comprising:
   a pair of opposing substrates, either substrate having electrodes and an LC orientating film formed on the surface opposing the other substrate; and
   a mass of liquid crystal filled in the gap between the substrates,
   wherein said LC orientating film is a polymer film consisting of stripe-shaped contracted portions extending in a predetermined direction and non-contracted portions located adjacent to the contracted portions.

2. A liquid-crystal orientating film comprising a polymer film consisting of stripe-shaped contracted portions and non-contracted portions located adjacent to the contracted portions.

3. The liquid-crystal orientating film according to claim 2, wherein said polymer film is made of photo-curable resin.

4. The liquid-crystal orientating film according to claim 2, wherein said polymer film is made of a mixture of photo-curable resin and thermosetting resin.

5. The liquid-crystal orientating film according to claim 2, wherein said polymer film is made of a mixture of photo-curable resin and thermoplastic resin.

6. The liquid-crystal orientating film according to claim 2, wherein said polymer film comprises a first layer made of soft resin and a second layer formed on the first layer and containing photo-curable resin.

7. The liquid-crystal orientating film according to claim 2, wherein said contracted portions and said non-contracted portions have a width ranging from 0.1 to 100 $\mu$m.

8. The liquid-crystal orientating film according to claim 7, wherein said contracted portions and said non-contracted portions have a width ranging from 1 to 50 μm.

9. The liquid-crystal orientating film according to claim 2, wherein said polymer film has a thickness ranging from 10 to 1000 nm.

10. The liquid-crystal orientating film according to claim 9, wherein said polymer film has a thickness ranging from 10 to 100 nm.

11. A method of manufacturing a liquid-crystal orientating film, comprising the step of applying light to selected portions of a polymer film, thereby forming stripe-shaped contracted portions, and forming non-contracted portions of the film which are located adjacent to the contracted portions.

12. The method according to claim 11, wherein said polymer is made of a resin including photo-curable resin.

13. The method according to claim 11, wherein said polymer film is heated after light has been applied to the film in order to form the contracted portions and the non-contracted portions.

14. The method according to claim 11, wherein said polymer film is heated before light is applied to the film in order to form the contracted portions and the non-contracted portions.

15. The method according to claim 11, wherein, after light has been applied to said polymer film in order to form the contracted portions and the non-contracted portions, less intense light is applied to the entire surface of said polymer film.

16. The method according to claim 11, wherein, before light is applied to said polymer film in order to form the contracted portions and the non-contracted portions, less intense light is applied to the entire surface of said polymer film.

* * * * *